United States Patent [19]
Gayler

[11] 3,883,434
[45] May 13, 1975

[54] REVERSE OSMOSIS APPARATUS
[75] Inventor: Ronald Gayler, Wantage, England
[73] Assignee: United Kingdom Atomic Energy Authority, London, England
[22] Filed: Oct. 5, 1973
[21] Appl. No.: 403,835

[30] Foreign Application Priority Data
Oct. 25, 1972 United Kingdom............. 49220/72
May 4, 1973 United Kingdom............. 21409/73

[52] U.S. Cl................................. 210/330; 210/433
[51] Int. Cl............................................ B01d 31/00
[58] Field of Search............ 210/23, 197, 321, 433, 210/330

[56] References Cited
UNITED STATES PATENTS

| | | | |
|---|---|---|---|
| 3,251,469 | 5/1966 | Muller | 210/197 X |
| 3,355,382 | 11/1967 | Huntington | 210/321 X |
| 3,400,074 | 9/1968 | Grenci | 210/23 |
| 3,405,058 | 10/1968 | Miller | 210/23 |
| 3,612,282 | 10/1971 | Cheng | 210/433 X |
| 3,669,879 | 6/1972 | Berriman | 210/23 |
| 3,819,056 | 6/1974 | Aitken et al. | 210/321 |
| 3,821,108 | 6/1974 | Manjikian | 210/321 X |

Primary Examiner—Frank A. Spear, Jr.
Attorney, Agent, or Firm—Larson, Taylor & Hinds

[57] ABSTRACT

Reverse osmosis apparatus comprises a membrane assembly mounting within a pressure shell. The assembly is mounted for rotation within the shell. Rotation during operation provides a higher recovery ratio of product liquid. Fluid turbine drive can be powered by the feed or reject liquid.

7 Claims, 6 Drawing Figures

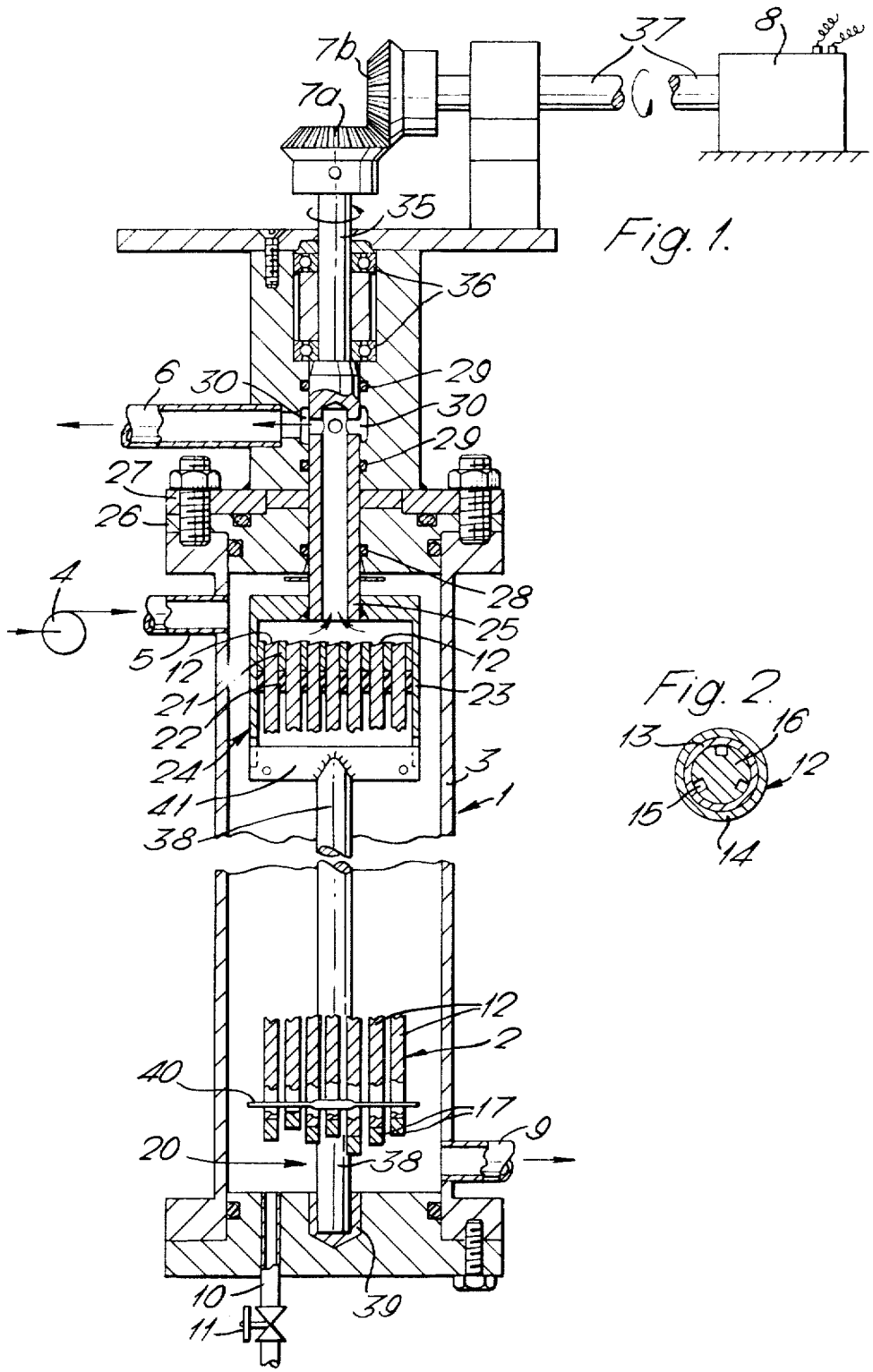

REVERSE OSMOSIS APPARATUS

BACKGROUND OF THE INVENTION

This invention relates to reverse osmosis apparatus.

The invention offers advantages over reverse osmosis apparatus disclosed by British Pat. Specification No. 1,325,494. The apparatus disclosed therein comprises a membrane assembly disposed within a pressure shell, with means for passing a feed solution through the assembly so as to obtain a product liquid by reverse osmosis. The membrane assembly comprises a bundle of rods with longitudinally extending grooves formed therein, each rod having a permeable substrate in the form of a sleeve covering the rod, a reverse osmosis membrane being deposited on the substrate. A feed solution is supplied under pressure to the pressure shell so that it contacts the exteriors of the rods, and after passage through the membranes, collects in the grooves as product liquid.

Unfortunately however, feed solution has to be supplied to the apparatus at a high flow rate (typically 2 ft/second) in order to avoid salts being deposited on the membranes and so interfering with the process. Furthermore, in order to obtain a significant recovery ratio, (ratio of product obtained to that of feed supplied), a number of such apparatus have to be connected in series.

SUMMARY OF THE INVENTION

According to the invention, reverse osmosis apparatus comprises a membrane assembly disposed within a pressure shell, means for passing a feed solution through the assembly so as to obtain a product liquid by reverse osmosis and assembly driving means for rotating the assembly within the shell.

By rotating the membrane assembly of a single apparatus this can provide a higher recovery ratio of product liquid than several such apparatus with non-rotatable assemblies, and furthermore, any tendency for salts to be deposited can be reduced whilst at the same time, velocities of feed solution within the apparatus can be reduced.

The assembly driving means may comprise an electric motor and gear unit.

Alternatively, the assembly driving means may comprise a fluid turbine and conveniently the feed-solution or the liquid rejected by the apparatus may be used as a working fluid to drive the turbine.

The apparatus may be provided with a plurality of membrane assemblies and assembly driving means for rotating them about a single axis.

BRIEF EXPLANATION OF THE DRAWINGS

An embodiment of the invention will now be described by way of example with reference to the accompanying drawings, wherein:

FIG. 1 is a fragmentary side view, in medial section, of reverse osmosis apparatus, FIG. 2 is a section, to an enlarged scale, of one of the rods in the membrane assembly of FIG. 1.

DETAILED DESCRIPTION OF THE INVENTION

Figure 3:
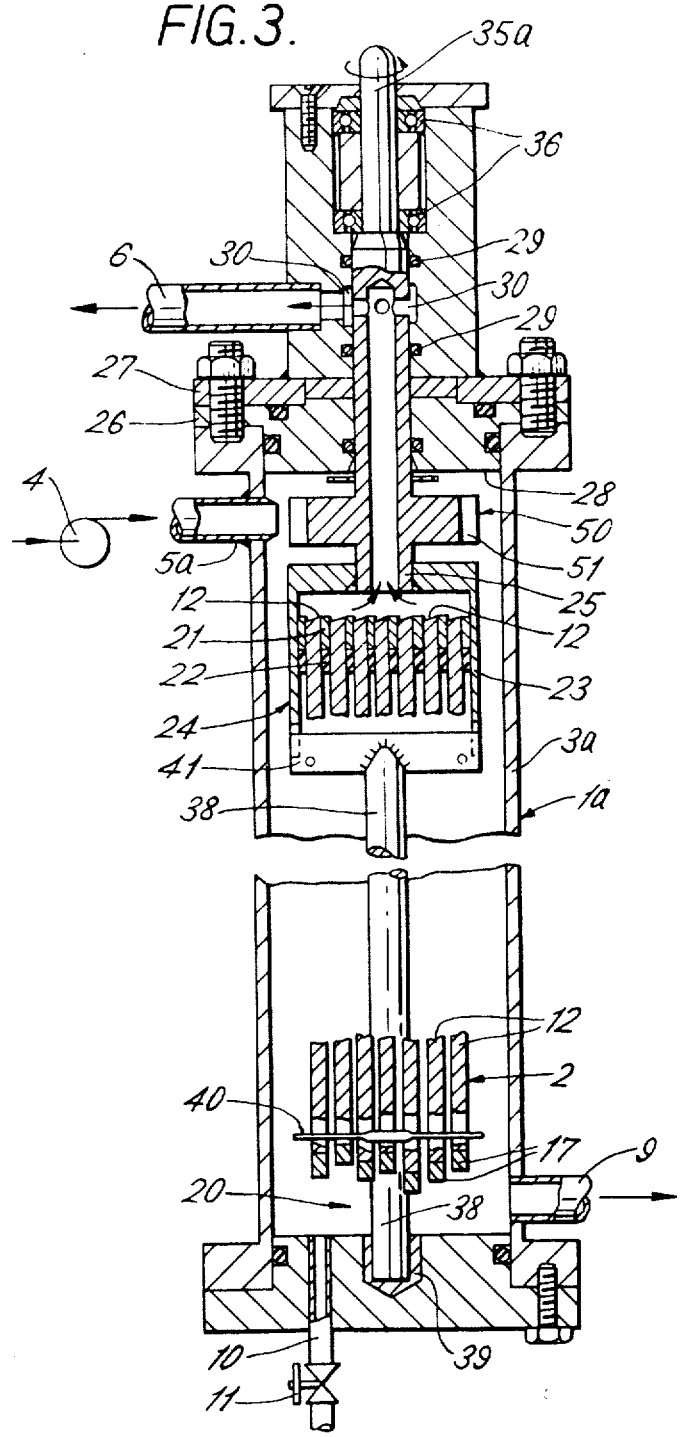
FIG. 3 is a fragmentary side view similar to FIG. 1 and illustrates a modification.

With reference to FIGS. 1 and 2, reverse osmosis apparatus 1 comprises a membrane assembly 2 disposed within a pressure shell 3, means comprising a pump 4, shell inlet 5 and assembly outlet 6 for passing a feed solution (brine) through the assembly 2 so as to obtain a product liquid (water) by reverse osmosis and assembly driving means comprising gears 7a, 7b and a variable-speed electric motor 8 for rotating the assembly 2 at high speed within the shell 3.

In further detail, the pressure shell 3 has a brine outlet 9 and a drain line 10 provided with a drain valve 11. The membrane assembly comprises a bundle of rods 12, each rod 12 comprising (FIG. 2 only) a permeable substrate in the form of a sleeve 13 covering the rod core 16 and a reverse osmosis membrane 14 deposited on the substrate. The cores 16 each have three longitudinally extending grooves 15 formed therein. Brine passes over the exteriors of the rods 12 and water passes through the membranes 14 to collect in the grooves 15 as the product liquid.

The rod cores 16 are of ⅛ inch (0.318 cms) diameter extruded plastics material such as polypropylene. The grooves 15 are of square section, and of 0.020 inches (0.051 cm) depth and width. The rods 12 are an average 8 feet (2.44 metres) in length. The substrate sleeves 13 each comprise a braiding of polyester fibres. The membranes 14 are derived from cellulose acetate applied to the sleeves 13 by passing the rod cores 16 through nozzles whereby membrane dope is extruded to form a substantially uniform thickness of cellulose acetate on each of the sleeves 13. The bottom ends of the rods 12 are sealed by tight fitting end caps 17 of natural rubber.

The rods 12 are mounted on a rotatable support 20. The upper ends of the rods 12 are located by a disc 21 and rubber seal 22 each of which is perforated by a series of locating holes. The disc 21 and rubber seal 22 are retained by a cup-like portion 23 of an end fitting 24. The end fitting 24 has a tubular portion 25 which extends upwardly through removable end covers 26, 27 of the pressure shell 3. Rubber seals 28, 29 seal the portion 25 to the covers 26, 27. The upper end of the tubular portion 25 has laterally-extending passageways 30 whereby water passing upwardly through the interior of the end fitting 24 enters the water outlet 6.

The bevel pinion gearwheel 7a is mounted on a shaft 35 which is attached to the upper end of the tubular portion 25 and which extends co-axially with the portion 25. The shaft 35 is located by a bearing assembly 36 mounted in the cover 27. The gearwheel 7a engages with the similarly-shaped gearwheel 7b, and the latter is mounted on a shaft 37 which is driven by the electric motor 8.

A central support spindle 38, the bottom end of which is located by a bearing bush 39, extends upwardly through the rod assembly 2. The bottom ends of the rods 12 are located by a perforated plate 40 attached to the spindle 38. The upper end of the spindle 38 is attached to the end fitting 24 by way of a crosspiece 41.

In operation, brine is supplied to the pressure shell 3 at about 400 p.s.i. and at a rate of 6 gallons per hour, the linear velocity in the shell being about 0.005 ft/sec. At the same time the motor 8 is used to rotate the rod assembly 2 at about 400 r.p.m.

The product water passes through the rotating rods 12 to leave the apparatus 1 by way of the outlet 6 and the rejected brine flows from the pressure shell 3 by way of the outlet 9. Output of product water at this speed is about 4 gallons per hour.

FIG. 3 illustrates modified reverse osmosis apparatus 1a comprising a membrane assembly 2 disposed within a pressure shell 3a, means comprising a pump 4, shell inlet 5a and assembly outlet 9 for passing a feed solution (brine) through the assembly 2 so as to obtain product liquid (water) by reverse osmosis, assembly driving means comprising a fluid motor in the form of a turbine 50, and means comprising the shell inlet 5a for using the feed solution to drive the turbine 50.

The turbine 50 comprises a turbine wheel mounted on a shaft 35a above the membrane assembly 2. The shaft 35a is co-axial with the spindle 38. The shell inlet 5a has a nozzle-like end which is disposed adjacent the blades 51 of the turbine 50 so that feed solution discharges under pressure from the inlet 5a to impinge on the blades 51 at a tangent to the periphery of the turbine wheel.

Figure 4:
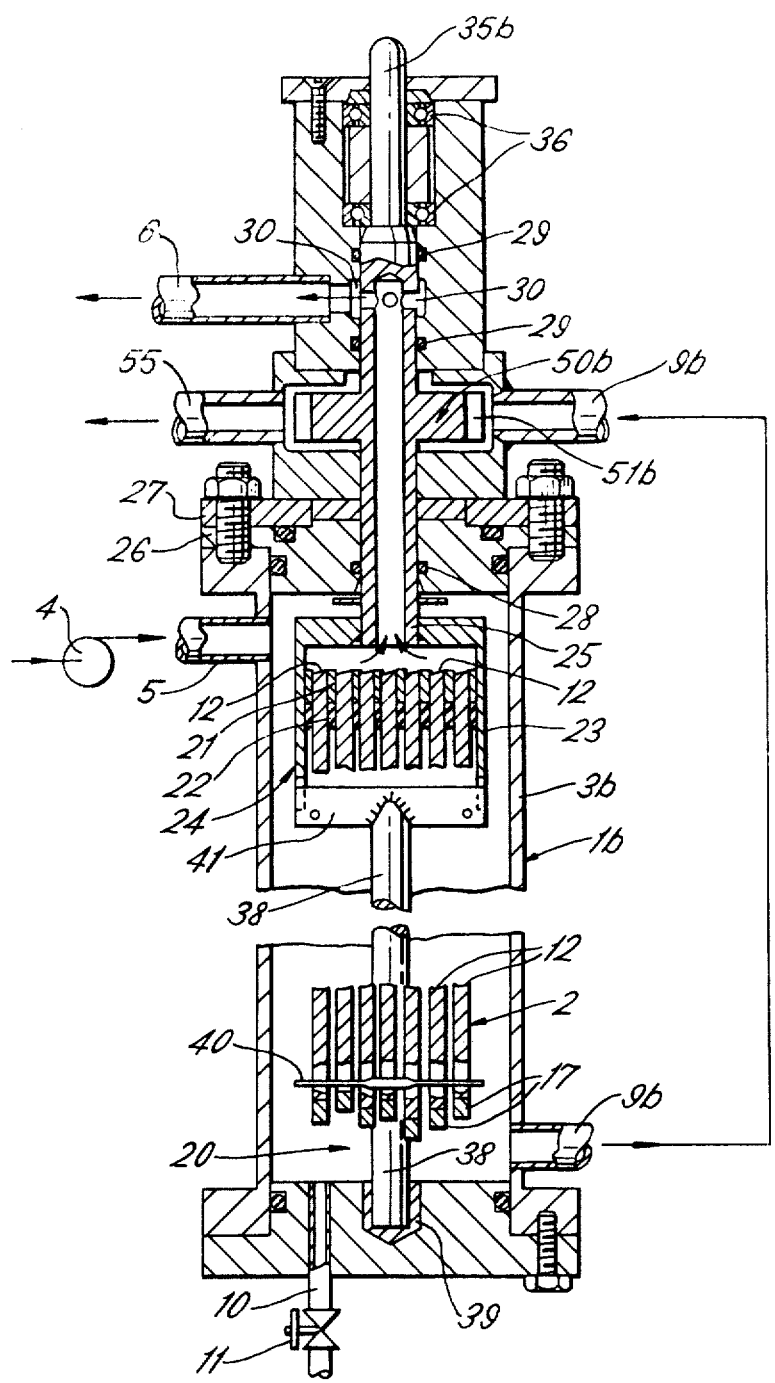
FIG. 4 is a fragmentary side view illustrating a modification of the apparatus shown in FIG. 3.

FIG. 4 shows a modification wherein reverse osmosis apparatus 1b has a fluid turbine 50b disposed outside the pressure shell 3b. In this modification the rejected liquid (brine) discharged from the outlet 9b is used to drive the turbine, before leaving the apparatus 1b by way of a duct 55.

Instead of using the reject liquid to drive the turbine 50b, the feed solution inlet 5 can be connected to the outlet 9b so as to discharge liquid to the turbine 50b. The duct 55 can then be used to discharge the liquid to the shell 3b.

The arrangements of FIGS. 3 and 4 make use of the pressure head of the feed solution, which is supplied by the pump 4.

Figure 5:
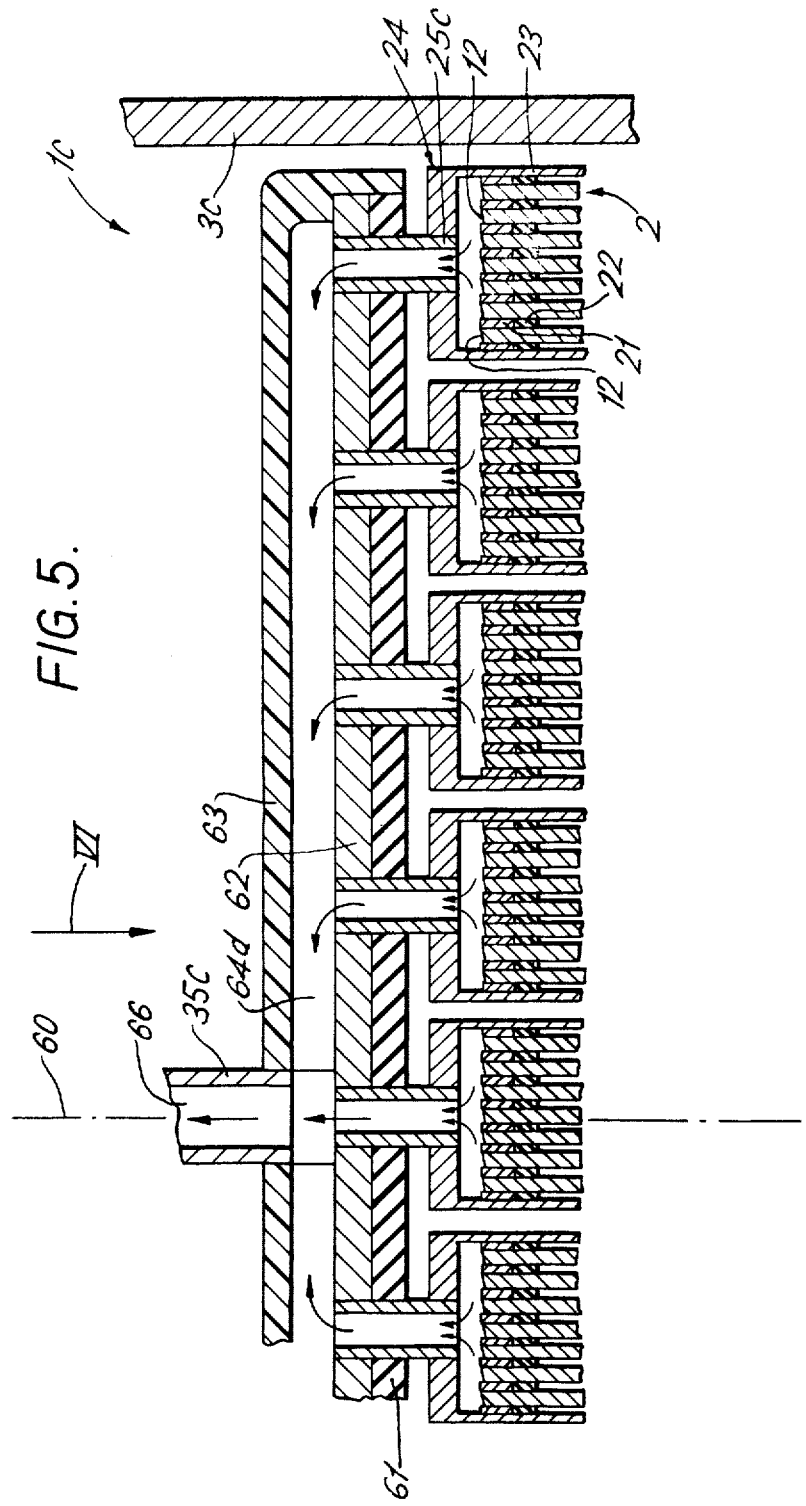
FIG. 5 is a fragmentary side view in medial section, of the upper part of reverse osmosis apparatus and illustrates yet another modification.
Figure 6:
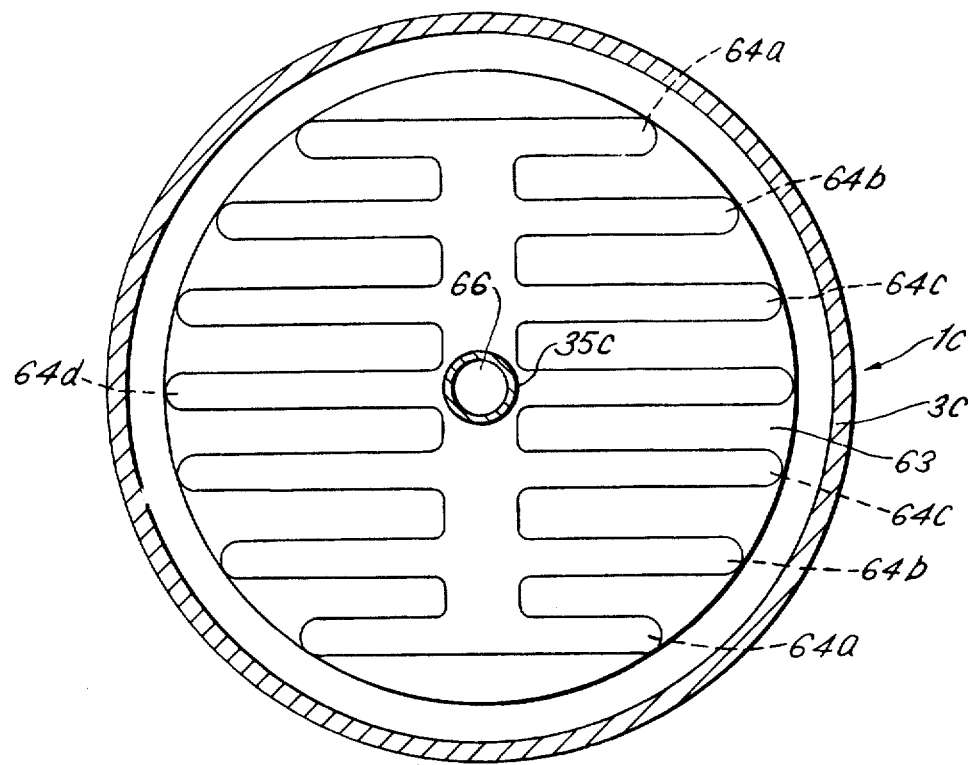
FIG. 6 is a view, to a reduced scale, and with added detail, looking in the direction of the arrow VI of FIG. 5.

With reference now to FIGS. 5 and 6, enlarged reverse osmosis apparatus 1e is provided with a plurality of membrane assemblies 2. Means (not shown) but which may comprise an electric motor and gear unit as in FIG. 1, or a fluid turbine as in FIGS. 3 or 4, are provided for rotating the assemblies 2 about a single (central) axis 60.

The apparatus 1c has thirty-seven membrane assemblies 2 distributed around the axis 60. The end fitting 24 of each assembly 2 has a short tubular extension 25c which is located by a rubber seal 61 and metal backing plate 62 both of which are circular in plan view. The seal 61 and plate 62 are retained by a close-fitting manifold 63. The manifold 63 is shaped to define a plurality of channels 64a, 64b, 64c and 64d which collect product liquid (water) discharged from the upper ends of the extensions 25c and conduct it away by way of common collection means comprising the bore 66 of a hollow shaft 35c, which shaft is rotated to rotate the membrane assemblies 2 about the axis 60. The product liquid eventually leaves the apparatus 1c by way of an outlet similar to the outlet 6. (FIGS. 1, 3 and 4).

The volumes of the channels 64a - - - 64d are kept as small as possible to avoid collapse of the manifold 63 (which is of plastics material) due to the substantial pressure differential (about 600 p.s.i.) existing across it.

The invention dispenses with the need for high (e.g. 2 ft/second) linear velocities within the apparatus, concentration polarisation being overcome by rotation of the rods 12 relative to the brine in the pressure shell. It is expected that salts in the brine will be flung off the rods and against the wall of the pressure shell.

The invention also allows the use of a single apparatus rather than two or more in series. This enhances plant design and makes it possible for the apparatus to be used as a domestic water softener for example.

The invention has application in the fields of ultra-filtration and sewage water recovery.

I claim:

1. Reverse osmosis apparatus comprising a stationary pressure shell, at least one bundle of rods disposed lengthwise within the shell so as to be rotatable within the shell about an axis, each rod having at least one longitudinally extending groove therein, a permeable substrate in the form of a sleeve covering the rod and a reverse osmosis membrane deposited on the substrate, manifold means mounted on one common end of a plurality of said rods, a hollow shaft attached to the manifold means, and extending along said axis, turbine means arranged to be energised by the pressure head of the feed solution for rotating the shaft and hence the bundle of rods within the said shell, means comprising a conduit for supplying a feed solution to the pressure shell so as to obtain a product liquid within said groove and said manifold by reverse osmosis, and means for collecting said product liquid by way of said shaft.

2. Apparatus as claimed in claim 1, wherein the turbine means is disposed in the supply conduit for feed solution to the pressure shell.

3. Apparatus as claimed in claim 1, wherein said apparatus includes an outlet conduit for rejected liquid from the pressure shell and wherein the turbine means is disposed in the outlet conduit.

4. Apparatus as claimed in claim 1 wherein the turbine means is disposed within the pressure shell.

5. Apparatus as claimed in claim 1 comprising a plurality of bundles of rods disposed about said axis, with the said bundles attached to a single manifold.

6. Apparatus as claimed in claim 1 wherein said rods are supported by a central support spindle disposed along said axis.

7. Apparatus as claimed in claim 6 wherein the pressure vessel includes spindle bearing means.

* * * * *